(12) United States Patent
Horner et al.

(10) Patent No.: US 7,562,558 B2
(45) Date of Patent: Jul. 21, 2009

(54) KNOCK SENSOR DIAGNOSTIC SYSTEM AND METHOD

(75) Inventors: Robert J. Horner, Dexter, MI (US); Craig M. Sawdon, Williamston, MI (US); Thomas A Szpakowski, South Lyon, MI (US); Brian Carl Nelson, Bath, MI (US); Karl T. Kiebel, Royal Oak, MI (US); Marilyn L Kindermann, Milford, MI (US); Anthony L. Marks, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/853,178

(22) Filed: Sep. 11, 2007

(65) Prior Publication Data

US 2009/0064762 A1 Mar. 12, 2009

(51) Int. Cl.
*G01L 23/22* (2006.01)
(52) U.S. Cl. .................................... 73/35.09
(58) Field of Classification Search ..... 73/35.01–35.06, 73/35.09
See application file for complete search history.

(56) References Cited

U.S. PATENT DOCUMENTS

| 3,575,039 | A  | * | 4/1971 | Beal .......................... 73/35.02 |
| 4,476,709 | A  | * | 10/1984 | Hattori et al. .............. 73/35.05 |
| 5,404,854 | A  | * | 4/1995 | Kamabora et al. ..... 123/406.16 |
| 6,448,778 | B1 | * | 9/2002 | Rankin ....................... 324/503 |
| 6,456,927 | B1 | * | 9/2002 | Frankowski et al. ........ 701/111 |
| 6,988,483 | B1 | * | 1/2006 | Hagari ................... 123/406.16 |
| 2006/0011169 | A1 | * | 1/2006 | Hagari ................... 123/406.16 |

* cited by examiner

*Primary Examiner*—Hezron Williams
*Assistant Examiner*—Gunnar J Gissel

(57) ABSTRACT

A knock sensor diagnostic system may include a knock sensor. A bias circuit applies a bias voltage to the knock sensor. An input circuit receives an input signal based on the bias voltage. A control module indicates a short circuit associated with the knock sensor based on the input signal. A knock sensor diagnostic system may also or alternatively include a signal generator that generates and applies a test signal with a predetermined frequency to the knock sensor. Another input circuit receives another input signal that is based on the test signal. A control module indicates an open circuit associated with the knock sensor based on the other input signal.

16 Claims, 3 Drawing Sheets

KNOCK SENSOR DIAGNOSTIC SYSTEM AND METHOD

FIELD OF THE INVENTION

The present invention relates generally to powertrain control systems, and more particularly to knock sensors.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustions engines combust an air and fuel (A/F) mixture within cylinders to produce drive torque. More specifically, the combustion events reciprocally drive pistons that in turn drive a crankshaft to provide output torque. The A/F mixture is ignited at a desired crank angle. In some instances, however, the A/F mixture auto-ignites ahead of an ignition flame-front within the cylinders. This results in abnormal combustion or engine knock.

During an engine knock condition, temperature and pressure of an unburned air/fuel mixture exceeds a certain level, which causes gases in an engine to auto-ignite. This combustion produces a shock wave that generates a rapid increase in cylinder pressure. Damage to pistons, rings, and exhaust valves can result if sustained heavy engine knock occurs. Engine knock can be heard by vehicle passengers.

Modern engine control systems are designed to minimize exhaust emissions while maximizing power and fuel economy. Advancements in spark timing for a given air/fuel ratio are made to increase power and improve fuel economy. In general, advancing a spark relative to top dead center increases torque until a point is reached at which a peak torque is produced. When the spark is advanced too far, engine knock occurs. Thus, a spark is typically advanced to maximize output torque without generating engine knock.

Accordingly, engine knock control systems have been developed to detect and to mitigate engine knock. Conventional knock detection systems include a knock sensor and a dedicated knock detection chip (knock IC) to process the knock sensor signal and calculate the engine knock intensity. An individual knock sensor and knock IC can be used to detect knock from each cylinder. Spark timing is adjusted based on detected engine knock.

Over time and use an engine knock sensor circuit may experience a short or an open circuit. As a result, signals received from an engine knock sensor may be inaccurate or ineffective in preventing engine knock. Diagnosing a knock sensor circuit is difficult due to intrinsic high resistance and moderate capacitance associated therewith.

SUMMARY OF THE INVENTION

A knock sensor diagnostic system is provided that includes a knock sensor. A bias circuit applies a bias voltage to the knock sensor. An input circuit receives an input signal based on the bias voltage. A control module indicates a short circuit associated with the knock sensor based on the input signal. The bias voltage may be a direct current (DC) bias voltage.

In another feature, a method of operating a knock sensor diagnostic system includes applying a bias voltage to a knock sensor. A first input signal is received based on the bias voltage. A test signal, with a predetermined frequency, is generated and applied to the knock sensor. A second input signal is received based on the test signal. A short circuit associated with the knock sensor is indicated based on the first input signal. An open circuit associated with the knock sensor is indicated based on the second input signal.

In still another feature, a knock sensor diagnostic system is provided that includes a knock sensor. A signal generator generates and applies a diagnostic signal with a predetermined frequency to the knock sensor. An input circuit receives an input signal that is based on the diagnostic signal. A control module indicates an open circuit associated with the knock sensor based on the input signal.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF EXEMPLARY EMBODIMENTS

Figure 1:
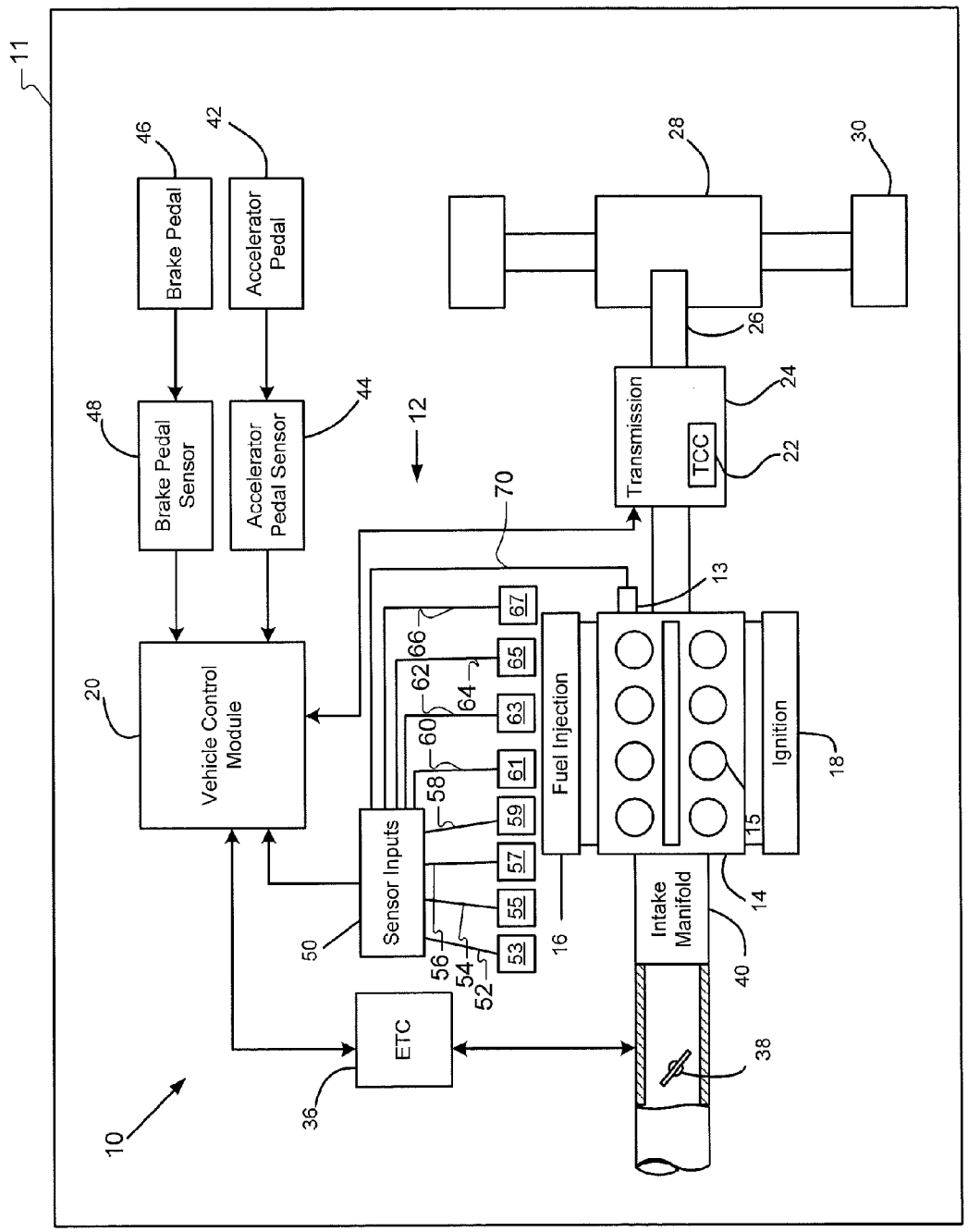
FIG. 1 is a functional block diagram of a vehicle control system according to an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a functional block diagram of a vehicle control system 10 of a vehicle 11 is shown. The vehicle control system 10 includes a knock sensor diagnostic system 12. The knock sensor diagnostic system 12 determines status of one or more knock sensors 13, which are mounted on an engine 14, and/or corresponding circuitry. The status may include output of a knock sensor, a fault with a knock sensor, a fault with corresponding knock sensor circuitry, quality of a knock sensor signal, and other knock sensor system status indicators. A fault with a knock sensor and/or corresponding circuitry may include a short circuit, an open circuit, or an improperly functioning circuit. A quality status may include signal levels, noise levels, signal-to-noise ratios, interference levels and other signal quality indicators.

Figure 2:
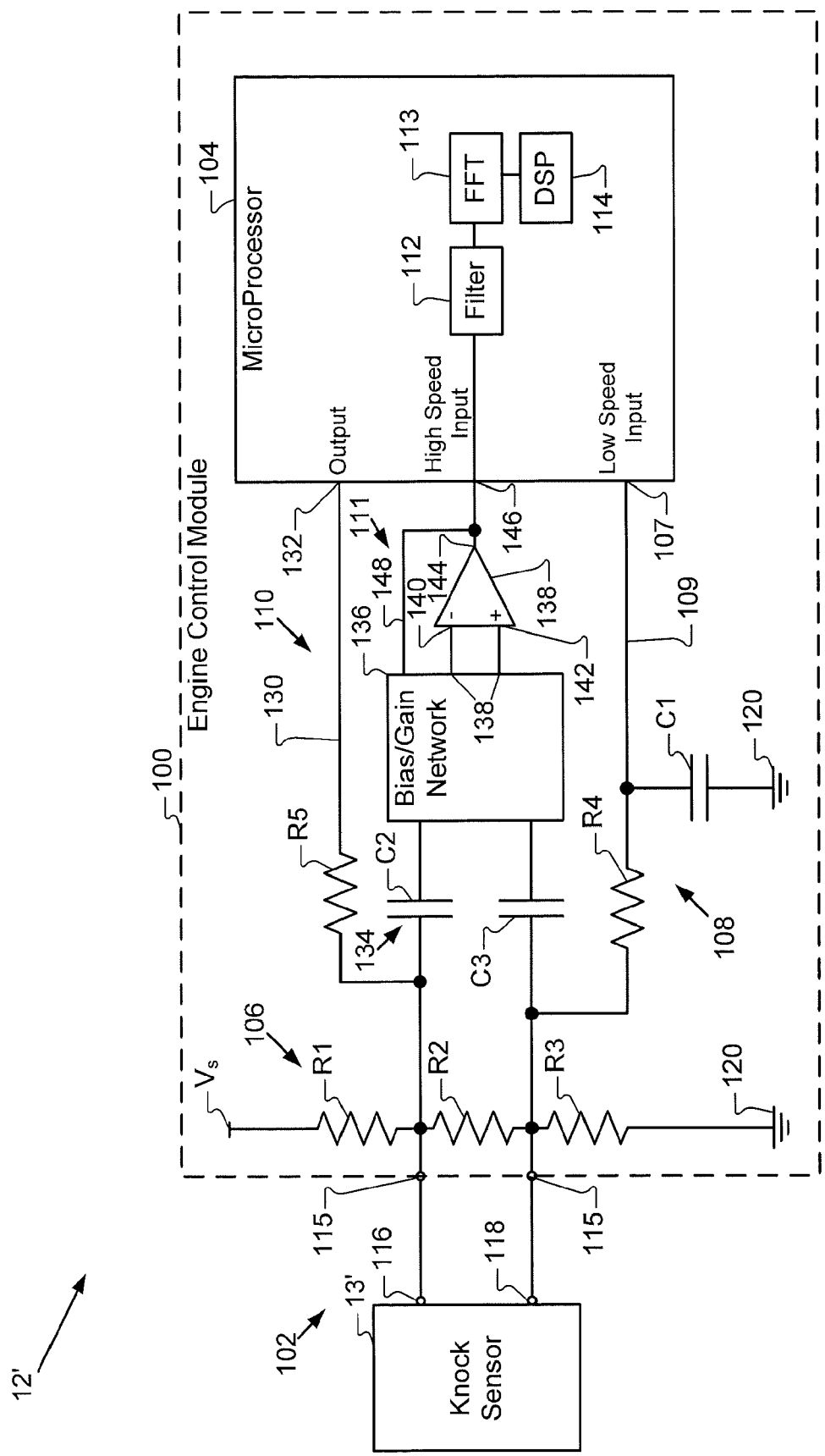
FIG. 2 is a functional block diagram and schematic view of a knock sensor diagnostic system according to an embodiment of the present disclosure.

A detailed example of a knock sensor diagnostic system that may be used in replacement of the knock sensor diagnostic system 12 is shown and described with respect to FIG. 2.

The vehicle 11 includes an engine 14 that has cylinders 15. Each cylinder 15 may have one or more intake valves and/or exhaust valves. The engine 14 is configured with a fuel injection system 16 and an ignition system 18. An output of the engine 14 is coupled by a torque converter 22, a transmission 24, a driveshaft 26 and a differential 28 to driven front wheels 30. The transmission 24 may, for example, be a continuously variable transmission (CVT) or a step-gear automatic transmission. The transmission 24 is controlled by a vehicle control module 20. Another control module, for example, a transmission control module may be used alone or in combination with the control module 20 in other embodiments to control the transmission 24.

An electronic throttle controller (ETC) 36, or a cable-driven throttle, adjusts a throttle plate 38 that is located adjacent to an inlet of an intake manifold 40. The adjustment is based upon a position of an accelerator pedal 42 and a throttle control algorithm that is executed by the control module 20. The throttle 38 adjusts output torque that drives the wheels 30. An accelerator pedal sensor 44 generates a pedal position signal that is output to the control module 20 based on a position of the accelerator pedal 42. A position of a brake pedal 46 is sensed by a brake pedal sensor or switch 48, which generates a brake pedal position signal that is output to the control module 20.

Other sensor inputs collectively indicated by reference number 50 and used by the control module 20 include an engine speed signal 52, a vehicle speed signal 54, an intake manifold pressure signal 56, a throttle position signal 58, a transmission throttle signal 60, transmission pulley speed signals 62, 64 and manifold air temperature signal 66. The sensor input signals 52-66 are respectively generated by engine speed sensor 53, vehicle speed sensor 55, intake manifold pressure sensor 57, throttle position sensor 59, transmission throttle sensor 61, pulley sensors 63, 65, and temperature sensor 67. The transmission throttle signal 60 indicates throttle pressure in the transmission 24. The pulley speed signals 62, 64 indicate transmission input and output pulley speeds. The temperature signal 66 indicates air temperature in the intake manifold 40. Other sensors may also be included.

A knock sensor 13, e.g., an accelerometer, is mounted on the engine 14 and senses combustion detonation and engine knock in one or more of the cylinders 15. The knock sensor 13 provides a knock sensor signal 70 to the control module 20 that indicates extent of sensed engine knocking. Knock detection in the vehicle 11 may be performed, however, using techniques, devices and/or methods other than by use of the knock sensor 13. For example, engine parameters that are sensed and determined, via components other than a knock sensor, may be used to indirectly determine whether knock is present.

Referring now also to FIG. 2, a functional block diagram and schematic view of a knock sensor diagnostic system 12' is shown. The knock sensor diagnostic system 12' includes one or more knock sensors 13' and an engine control module (ECM) 100. Each knock sensor 13' is part of a knock sensor circuit 102. The ECM 100 may be part of the vehicle control module 20 or may be a separate stand alone control module. The ECM 100 includes an ECM microprocessor 104, a biasing circuit 106, a low-speed input circuit 108, an output test circuit 110, and a high-speed input circuit 111.

The ECM microprocessor 104 may be in the form of or included as part of an integrated circuit (IC) chip. Although the ECM microprocessor 104 is shown having a particular number of inputs and outputs, additional inputs and outputs, such as inputs and outputs dedicated to knock sensor control, monitoring, and diagnostics, may be incorporated. The ECM may include a filter 112, a Fast Fourier Transform (FFT) device 113, and a digital signal processor (DSP) 114. The filter 112 may be a multiple order infinite impulse response (IIR) filter or some other filter. The filter 112 and the FFT 113 filter and convert a high-speed input signal 117 from a time domain representation to a frequency domain representation. The DSP 114 may be used to implement the filter and FFT functions in digital format.

The biasing circuit 106 and low-speed input circuit 108 are directed to detection of a short circuit within the knock sensor 13' and/or associated circuitry. The output test circuit 110 and high-speed input circuit 111 are directed to detection of an open circuit within the knock sensor 13' and/or associated circuitry. The high-speed input circuit 111 is also directed to the detection of engine knock.

The ECM 100 has input/output (I/O) terminals 115, which are coupled to the knock sensor circuit 102. For the example shown, the knock sensor circuit 102 includes the knock sensor 13', which has knock sensor high and low-side terminals 116, 118. The knock sensor terminals 116, 118 may perform as input and/or output terminals. The knock sensor 13' may include, for example, a piezoelectric crystal that is mounted on a metal can, which picks up audible noise. The knock sensor 13' may include other elements or devices that allow for the detection of engine knock.

The biasing circuit 106 applies a bias voltage across the knock sensor terminals 116, 118. The biasing circuit 106 may include a first resistor R1, a second resistor R2, and a third resistor R3, which are coupled in series. The first resistor R1 is coupled between a voltage supply $V_s$ and the sensor high-side terminal 116. The second resistor R2 is coupled between the first resistor R1 and the third resistor R3. The second resistor R2 is also coupled across the knock sensor terminals 116, 118. The third resistor R3 is coupled between the second resistor R2 and the ground reference 120.

The low-speed input circuit 108 may perform as a low pass filter and may include a fourth resistor R4 and a first capacitor C1. The fourth resistor R4 is coupled between the low-side terminal 118 and a low-speed input 107 of the ECM microprocessor 104. A first end of the first capacitor C1 is coupled to both the fourth resistor R4 and the low-speed input 107. The other end of the first capacitor C1 is coupled to the ground reference 120. The low-speed input circuit 108 provides a low-speed input signal 109 to the ECM microprocessor 104.

The output test circuit 110 provides a diagnostic test signal 130 to the knock sensor 13'. The test signal 130 may be provided to the high-side of the knock sensor 13'. The output test circuit 110 may include a fifth resistor R5, which is coupled between the high-side terminal 116 and a diagnostic test output 132 of the ECM microprocessor 104.

The high-speed input circuit 111 includes an alternating current (AC) coupling circuit 134, a bias/gain network 136 and an amplifier 138. The AC coupling circuit removes direct current (DC) bias and may include a second capacitor C2 and a third capacitor C3. The second capacitor C2 is coupled between the high-side terminal 116 and the bias/gain network 136. The third capacitor C3 is coupled between the low-side terminal 118 and the bias/gain network 136. The capacitors C2, C3 AC couple a knock sensor signal on ECM terminals 115 to the bias/gain network 136. This removes the static bias applied by the bias circuit 106.

The bias/gain network 136 may include bias and gain adjusting elements that are used to adjust the bias and gain of signals received from the knock sensor 13'. The bias/gain network 136 provides a differential output 138 that is provided to inverting and non-inverting inputs 140, 142 of the amplifier 138. Output 144 of the amplifier 138 is coupled to a high-speed analog-to-digital converter (ADC) input 146 of the ECM microprocessor 104. A feedback signal path 148 is provided between the bias/gain network 136 and the output 144.

Note that the low-speed and high-speed designations, with regards to the inputs 107, 146, correspond to the reception of low or high frequency signals. The low-speed and high-speed designations indicate low-speed and high-speed sampling and processing rates for inputs 107, 146 by the microprocessor 104.

The above-described elements of the knock sensor diagnostic system 12' are provided for example purposes only. Other elements may be included and/or replace the above-described elements. As an example, a knock IC that includes the ECM microprocessor 104 may include amplifiers, filters, a rectifier, an integrator, an A/D converter, a sample and hold device, and other analog and/or digital circuit elements.

Figure 3:
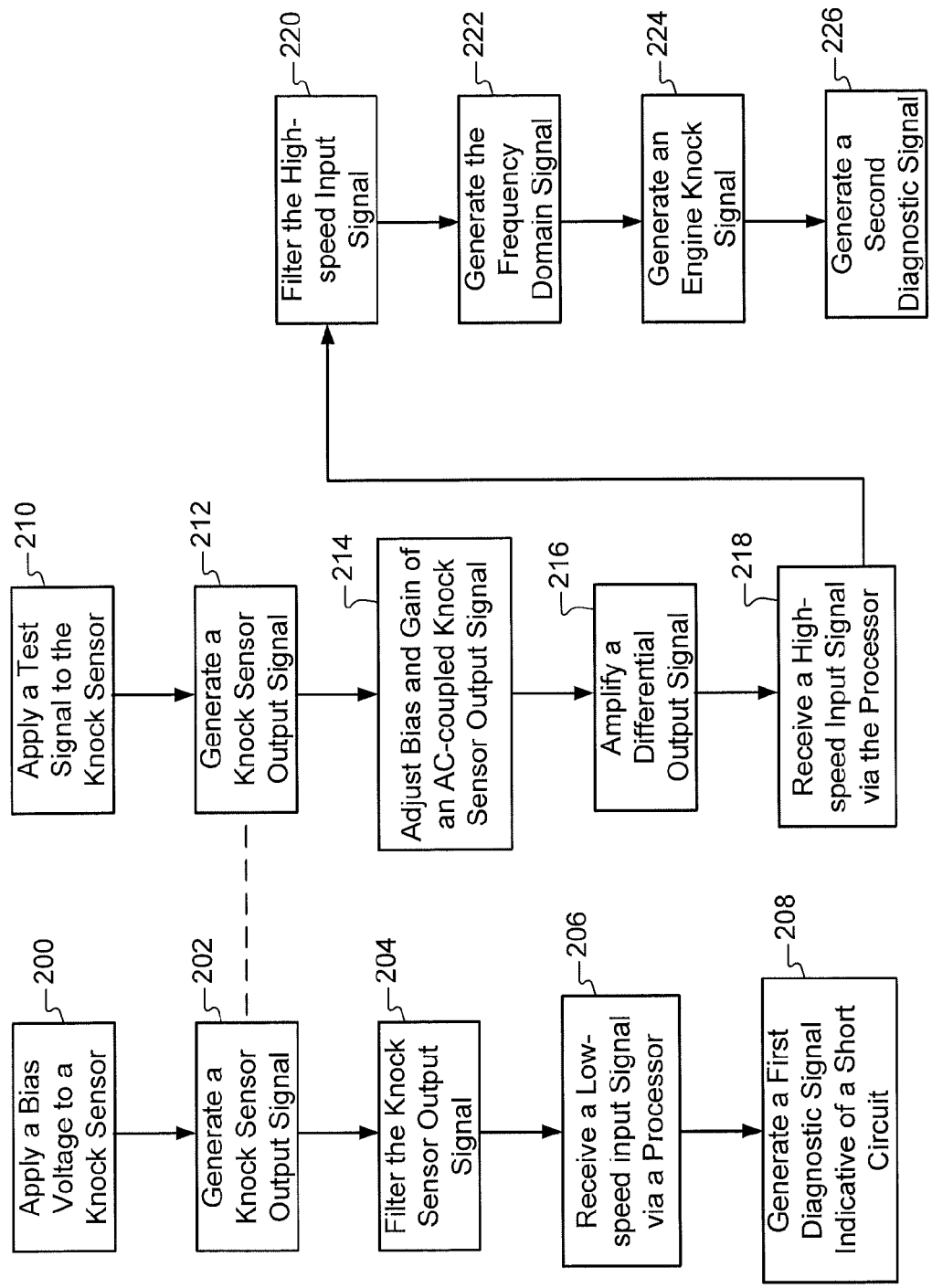
FIG. 3 is a flow diagram illustrating a method of operating a knock sensor diagnostic system according to an embodiment of the present disclosure.

Referring now also to FIG. 3, a flow diagram illustrating a method of operating a knock sensor diagnostic system is shown. Although the following steps are described primarily with respect to operation of the knock sensor diagnostic system of FIG. 2, the steps may be easily modified to apply to other embodiments of the present invention.

In step 200, the bias circuit 106 applies a bias voltage to the knock sensor 13'. As an example, the supply voltage $V_s$ may be 5v. In step 202, the knock sensor 13' generates a knock sensor output signal, which has a high-side component and a low-side component. The high and low side components are provided on the high and low side output terminals 116, 118.

In step 204, the low-speed input circuit 108 filters the knock sensor output signal or a component thereof to generate the low-speed input signal 109. In the example embodiment of FIG. 2, the low-speed input circuit 108 filters the low-side component and removes high frequencies, such as noise. Use of a low-pass filter prevents false diagnosis due to high frequency signals. The low-pass filter may, as an example, have a cutoff frequency of approximately 100-200 Hz. The low-speed circuit 108 may also remove frequency components associated with engine knock.

In step 206, the ECM microprocessor 104 receives the low-speed input signal 109, which is based on the applied bias voltage. In step 208, the ECM microprocessor 104 generates a first diagnostic signal and/or indicates a short circuit associated with the knock sensor 13' based on the low-speed input signal 109. When a short does not exist, a nominal voltage is measured by the ECM microprocessor 104. When a short circuit does exist, such as a short to ground or a high-voltage potential on either side of the knock sensor 13', a substantial change in the nominal voltage occurs. This change is detected by the ECM microprocessor 104, which can then make a robust diagnostic decision. The high-voltage potential may, for example, be greater than the supply voltage $V_s$.

In step 210, the output test circuit 110 generates and applies the test signal 130, with a predetermined frequency, to the knock sensor 13'. The test signal 130 may be in the form of a square wave and applied to the high-side of the knock sensor 13', as shown in FIG. 2. In one embodiment, the predetermined frequency is set outside a frequency range associated with knock detection. In another embodiment, the predetermined frequency is set outside a frequency range associated with engine background noise. In yet another embodiment, the predetermined frequency is set at approximately 20-21 kHz or approximately 20.5 kHz, which is greater than an engine knock frequency window of approximately 5-18 kHz and a normal engine noise frequency range. There is significant separation between the predetermined frequency and the engine knock frequency window. Note that the predetermined frequency may be greater than or less than the frequency ranges associated with engine knock and engine noise. Since the predetermined frequency is greater than or outside a frequency range that is associated with engine knock detection, the test signal 130 does not affect engine knock detection. Step 210 may be performed continuously.

In step 212, the knock sensor 13' generates a knock sensor output signal, similar to step 202. Steps 202 and 212 may be performed simultaneously, may be performed as a single step, and/or may be performed continuously.

In step 214, the bias/gain network 136 adjusts bias and gain of the knock sensor signal after AC coupling by the AC coupling circuit 134. In step 216, the amplifier 138 amplifies the differential output signal from the bias/gain network 136. In step 218, output of the amplifier 138 or the high-speed input signal 117 is received by the ECM microprocessor 104. The high-speed input signal 117 is based on the test signal 130.

In step 220, the filter 112 filters the high-speed input signal 117. The filter 112 removes signals having frequency above the predetermined frequency. In step 222, the FFT device 113 generates a frequency domain signal that is based on the filtered high-speed input signal 117.

In step 224, the ECM microprocessor 104 generates an engine knock signal that is based on the frequency domain signal. Engine knock intensity is calculated, which is based on the knock sensor signal. An individual knock sensor and knock IC can be used to detect knock from each cylinder of an engine. Steps 220-224 may be performed within the ECM microprocessor 104, via dedicated software. Steps 220-224 may also be performed via hardware.

In step 226, generating a second diagnostic signal and/or indicates an open circuit associated with the knock sensor 13' based on the high-speed input signal 117 and/or normal engine audible levels, which may include background noise.

In operation of the knock sensor diagnostic system 12', open circuit diagnosis at low engine speeds may be performed by applying the test signal, as described above. Low engine speeds may refer to speeds at approximately less than a predetermined engine speed, such as 3000 revolutions-per-minute (RPM). The test signal passes through capacitance of the knock sensor 13'. The test signal is detected on both terminals 116, 118 and is substantially the same on both terminals 116, 118. Thus, at the terminals 116, 118 the test signal is referred to as a common mode signal. The common mode signal is rejected by the amplifier 138, which results in only a small differential signal at the applied frequency. An open circuit in the knock sensor 13' or associated circuit converts the test signal into a differential mode signal, which is detected by the amplifier 138. As a result, there is an increase in amplitude of the high-speed input signal 117, which is robustly detected by the ECM microprocessor 104 after signal processing. Thus, similar processing is used for both normal engine knock detection operation, as well as open circuit detection. Note that the test signal may be applied and amplitude thereof may be detected at any engine operating speed or over an entire engine speed range.

At high engine speeds, such as at speeds at or equal to approximately the predetermined engine speed, engine background noise may begin to "drown out" the applied test signal. This is true when the predetermined frequency is not outside the frequency range of the engine noise. At speeds above the predetermined engine speed, signal levels from the engine background noise allow for a robust detection of an open circuit. When an open circuit is present the ECM microprocessor 104 is unable to detect the engine background noise via the knock sensor 13'. Thus, at high engine speeds, the ECM microprocessor may determine the presence of an open circuit due to lack of engine background noise detection. Approximate engine background noise levels may be stored and compared with current detected background noise levels to determine presence of an open circuit.

Thus, the high-speed signal channel may be used for open circuit diagnosis over low and high engine speeds. High-speed open circuit detection may be based on the test signal and/or on the lack of engine background noise, depending upon whether the predetermined frequency is within the frequency range of the engine background noise. The test signal can be applied continuously without interfering with the normal engine knock detection operation.

The above-described steps are meant to be illustrative examples; the steps may be performed sequentially, synchronously, simultaneously, continuously, or in a different order depending upon the application.

The disclosed embodiments herein provide a knock sensor diagnostic system that provides open circuit detection and is robust with respect to sensor variation for short circuit detection. The embodiments allows for up-integration of a variable gain amplifier into processors.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A knock sensor diagnostic system comprising:
a knock sensor;
a bias circuit that applies a bias voltage to said knock sensor;
a first input circuit that receives a first input signal based on said bias voltage;
a control module that indicates a short circuit associated with said knock sensor based on said first input signal;
a signal generator that generates and applies a test signal with a predetermined frequency to said knock sensor; and
a second input circuit that receives a second input signal based on said test signal,
wherein said control module detects an amplitude of said test signal based on an engine speed and indicates an open circuit associated with said knock sensor based on said second input signal.

2. The knock sensor diagnostic system of claim 1 wherein said first input circuit comprises a low pass filter that filters an output of said knock sensor to generate said first input signal.

3. The knock sensor diagnostic system of claim 2 wherein said low pass filter comprises:
a resistance that is coupled between said knock sensor and said control module; and
a capacitance that is coupled between said resistance and a reference ground.

4. The knock sensor diagnostic system of claim 1 wherein said first input circuit is coupled to a low-side of said knock sensor.

5. The knock sensor diagnostic system of claim 1 wherein said signal generator is coupled to a high-side of said knock sensor.

6. The knock sensor diagnostic system of claim 1 wherein said bias voltage is a direct current (DC) bias voltage.

7. The knock sensor diagnostic system of claim 1 wherein said second input circuit comprises an alternating current coupling circuit that removes said bias voltage from a knock sensor output signal from said knock sensor.

8. The knock sensor diagnostic system of claim 7 wherein said alternating current coupling circuit comprises:
a first capacitance coupled to a high-side of said knock sensor; and
a second capacitance that is coupled to a low-side of said knock sensor.

9. The knock sensor diagnostic system of claim 1 further comprising:
A filter that generates that generates a filtered signal based on a said second input signal;
A Fast Fourier Transform device that generates a frequency domain signal based on said second input signal; and
A signal processor that generates an engine knock signal based on said frequency domain signal.

10. The knock sensor diagnostic system of claim 1 wherein said bias circuit comprises:
a first resistance that is coupled between a voltage supply and a first terminal of said knock sensor;
a second resistance that is coupled across said knock sensor; and
a third resistance that is coupled between a second terminal of said knock sensor and a ground reference terminal.

11. The knock sensor diagnostic system of claim 1 wherein said test signal has a frequency level that is outside a frequency range associated with at least one of knock detection and engine background noise.

12. The knock sensor diagnostic system of claim 1 wherein said control module detects the amplitude of said test signal when the engine speed is less than or equal to a predetermined speed.

13. The knock sensor diagnostic system of claim 1 wherein said control module detects background noise when the engine speed is greater than a predetermined speed, and
Wherein said control module indicates said open circuit associated with said knock sensor based on said background noise.

14. The knock sensor diagnostic system of claim 1 wherein said control module detects the amplitude of said test signal over an operating speed range of said engine.

15. A knock sensor diagnostic system comprising:
a knock sensor;
a bias circuit that applies a bias voltage to said knock sensor;
a signal generator that generates and applies a test signal with a predetermined frequency to said knock sensor;
an input circuit that receives an input signal based on said test signal; and
a control module that detects an amplitude of said test signal based on an engine speed and indicates an open circuit associated with said knock sensor based on said input signal.

16. A knock sensor diagnostic system comprising:
a knock sensor;
a bias circuit that applies a bias voltage to said knock sensor;
a first input circuit that receives a first input signal based on said bias voltage;
a control module that indicates a short circuit associated with said knock sensor based on said first input signal;
a signal generator that generates and applies a test signal with a predetermined frequency to said knock sensor; and
a second input circuit that receives a second input signal based on said test signal,
wherein said control module indicates an open circuit associated with said knock sensor based on said second input signal, and
wherein said test signal has a frequency level that is outside a frequency range associated with at least one of knock detection and engine background noise.

* * * * *